United States Patent [19]

Kopp

[11] 4,197,462
[45] Apr. 8, 1980

[54] POSITION-SENSITIVE PROPORTIONAL COUNTER WITH LOW-RESISTANCE METAL-WIRE ANODE

[75] Inventor: Manfred K. Kopp, Oak Ridge, Tenn.

[73] Assignee: The United States of America as represented by the United States Department of Energy, Washington, D.C.

[21] Appl. No.: 966,525

[22] Filed: Dec. 4, 1978

[51] Int. Cl.² .............................................. G01T 1/18
[52] U.S. Cl. ....................................... 250/374; 250/388
[58] Field of Search ............... 250/374, 375, 388, 385; 307/264, 268; 330/85, 107

[56] References Cited

U.S. PATENT DOCUMENTS

| 3,483,377 | 12/1969 | Borkowski et al. | 250/374 |
| 3,517,194 | 6/1970 | Borkowski et al. | 250/385 |
| 3,704,421 | 11/1972 | Blane | 330/85 |

OTHER PUBLICATIONS

Borkowski et al., *Rev. Sci. Inst.*, "Design and Properties of Position-Sensitive Proportional Counters Using Resistance-Capacitance Position Encoding," 46, (No. 8), pp. 951-962, 1975.
Farugi, *IEEE Trans. Nucl. Sci.*, NS-22, (5), "Application of Nuclear Inst. Tech. to X-Ray Diffraction from Muscle," pp. 2066-2073, 1975.
Gabriel, *Rev. Sci. Inst.*, "Position Sensitive X-Ray Detector," 48, pp. 1303-1305, 1977.
Kuhlmann et al., *Nuclear Instruments and Methods*, 40, 1966, pp. 118-120.
Kopp et al., *Rev. Sci. Instruments*, "Low-Noise Voltage-Sensitive Preamplifier with Output Stabilization by Pole-Zero Cancellation in the Feedback Circuit," 48, 1977, pp. 383-388.
Augustynia, K., et al., *IEEE Trans. Nucl. Sci.*, NS-22, (5), "A Hybrid Approach to Two Dimensional Charged Particle Position Sensing Preserving Energy Resolution," 1972, pp. 196-200.

*Primary Examiner*—Bruce C. Anderson
*Attorney, Agent, or Firm*—R. V. Lupo; Robert M. Poteat; David E. Breeden

[57] ABSTRACT

A position-sensitive proportional counter circuit is provided which allows the use of a conventional (low-resistance, metal-wire anode) proportional counter for spatial resolution of an ionizing event along the anode of the counter. A pair of specially designed active-capacitance preamplifiers are used to terminate the anode ends wherein the anode is treated as an RC line. The preamplifiers act as stabilized active capacitance loads and each is composed of a series-feedback, low-noise amplifier, a unity-gain, shunt-feedback amplifier whose output is connected through a feedback capacitor to the series-feedback amplifier input. The stabilized capacitance loading of the anode allows distributed RC-line position encoding and subsequent time difference decoding by sensing the difference in rise times of pulses at the anode ends where the difference is primarily in response to the distributed capacitance along the anode. This allows the use of lower resistance wire anodes for spatial radiation detection which simplifies the counter construction and handling of the anodes, and stabilizes the anode resistivity at high count rates ($>10^6$ counts/sec).

4 Claims, 4 Drawing Figures

POSITION-SENSITIVE PROPORTIONAL COUNTER WITH LOW-RESISTANCE METAL-WIRE ANODE

BACKGROUND OF THE INVENTION

This invention was made during the course of, or under, a contract with the U.S. Department of Energy.

This invention relates generally to position-sensitive radiation detectors and more specifically to pulse processing circuitry for use with ionizing radiation detecting elements to obtain spatial resolution of an ionizing event along the anode of the detector through the use of RC line encoding.

The following references are cited to aid in the discussion of the background of the invention:

1. U.S. Pat. No. 3,483,377, issued Dec. 9, 1969 to Casimer J. Borkowski and Manfred K. Kopp for "Position-Sensitive Radiation Detector."
2. U.S. Pat. No. 3,517,194, issued June 23, 1970 to Casimer J. Borkowski and Manfred K. Kopp for "Improved Position-Sensitive Radiation Detector."
3. W. R. Kuhlmann et al, *Nuclear Instruments and Methods*, 40, 118–120, 1966.
4. M. K. Kopp and J. A. Williams, *Rev. Sci. Instruments*, 48, 383, 1977.

The above patent references (1 and 2) have a common assignee with the present invention.

In the art various designs have been advanced that utilize resistance-capacitance (RC) position information encoding to determine the position of an event along the detector anode. In some position-sensitive proportional counters (PSPC) systems, the position coordinate of each detected photon is encoded by the RC line properties of the counter, i.e., the distributed anode resistance and anode-to-cathode capacitance, and decoded by either pulse amplitude difference measurements or time difference measurements.

The above reference 3 (Kuhlmann, et al) relates to a typical system for pulse amplitude difference measurement to achieve ionization event position information. In the Kuhlmann device conventional voltage sensitive preamplifiers are connected to both ends of the collector wire of a proportional counter. An ionizing event along the wire gives rise to energy-dependent localization pulses wherein the amplitude is proportional to the energy of the entering photon and the position along the wire. These pulses are sensed by the preamplifiers and further compared to provide an energy independent ratio between the energy dependent voltages sensed at each end of the wire. The problem with this type of detector is that counters longer than approximately 30 cm. lose their linearity due to transmission line effects. The transmission line effects which produce pulses whose rise times differ with position along the wire produce errors in the pulse amplitude measurements and are detrimental to the measurements.

The above-referenced patents describe systems which use the pulse rise time for position encoding. These systems use highly resistive collectors (carbon-coated quartz fiber) to produce pulses whose rise times at the collector ends are proportional to the location of the event from the respective collector ends. Although the patents describe systems which decode the rise time information taken at one end of the collector, it is a more common practice to use essentially the same decoding circuitry connected to sense the pulses at each end of the collector, as shown in FIG. 1 of this application. The position coordinate of each detected photon is encoded by the RC line properties of the position-sensitive counter and decoded by time-difference measurements. A pair of high-input-impedance, series-feedback preamplifiers is used to capacitively terminate the RC line and linearly transfer the two collector signals of a detected photon into low-impedance input signal processing equipment. Since stray capacitance is a load impedance that degrades the signal-to-noise ratio and signal processing time, the preamplifier leads are made as short as possible to minimize stray capacitance.

Pulse shaping and time-difference measurement (rather than amplitude measurement) are used to decode the position coordinates of the ionization event within the counter. The anode-cathode network of the counter (FIG. 1) is considered as a distributed RC line of length L, where $R_o$ and $C_o$ are the anode resistance and the anode-to-cathode capacitance, respectively.

In this method of decoding, the count-rate capability is directly proportional to the anode resistance, $R_o$. Circuit considerations such as detector resolution, count-rate capability, etc., make the desirable operating range of the anode resistance $R_o$ higher than that of metal wires but lower than that of quartz fibers. In order to operate PSPC's in this middle resistance range, the anode is usually a quartz fiber coated with pyrolytic carbon that provides the desired uniform resistance throughout its length.

Metal-wire anode counters for position detection have been built with some sacrifice in the operating parameters occurring when the anode is made less than 40 cm. in length. There are applications such as in crystallography where the features of short metal wire anodes are more appropriate—features such as ruggedness, ease of handling, and stability at high count rates. Despite this, the carbon-coated quartz anodes have usually prevailed.

The basis of the subject invention is in recognizing that in the RC-line encoding method, it is really the product of the resistance $R_o$ and total capacitance ($C_{GT} = C_o L + 2C_L$) that determines the RC time constant of the counter, where $C_L$ represents the total capacitive load impedance connected to the counter outputs, composed of stray and preamplifier input capacitance. Consequently, the requirement for sensitivity may be shifted from the anode resistance $R_o$ to the total capacitance $C_{GT}$. The obvious approach of adjusting the RC time constant by capacitance change rather than by resistance change is to put physical capacitors across the outputs of the RC line. However, simply adding capacitance degrades the signal-to-noise ratio and hence the resolution. Thus, there is a need for a position-sensitive proportional counter system which allows the use of rugged and stable low-resistance, metal-wire anodes of conventional proportional counters of any length for RC event position encoding and accurate, sensitive and responsive time difference decoding.

SUMMARY OF THE INVENTION

In view of the above need, it is a primary object of this invention to provide a position-sensitive radiation detection system which allows RC-line event position encoding with low-resistance anode wires.

Further, it is an object of this invention to provide the detection system, as set forth in the above object, wherein the low-resistance, metal-wire anode is combined with a stabilized active capacitance loading preamplifier circuit to obtain RC time constant encoding of the position of an ionizing event along the anode.

Yet another object of this invention is to provide a position-sensitive proportional counter RC encoding system which is rugged, easy to construct, and stable at high count rates.

In summary, a position-sensitive radiation detection system is provided wherein RC encoding of event position is made possible in an ionizing radiation detecting element having a low-resistance anode. A pair of specially designed active-capacitance input preamplifiers are connected to the respective anode ends to sense electrical pulses produced in response to an ionizing event at a location along the anode. Each of the preamplifiers includes a series-feedback amplifier and a shunt-feedback amplifier connected in series with a capacitor in the feedback loop to provide a highly stabilized active-capacitance load to obtain accurate position information from the rise times of the pulses processed by a pulse timing means connected to the output of the preamplifiers.

Other objects and many of the attendant advantages of the present invention will be obvious from the following detailed description taken in conjunction with the drawings.

DETAILED DESCRIPTION

Figure 1:
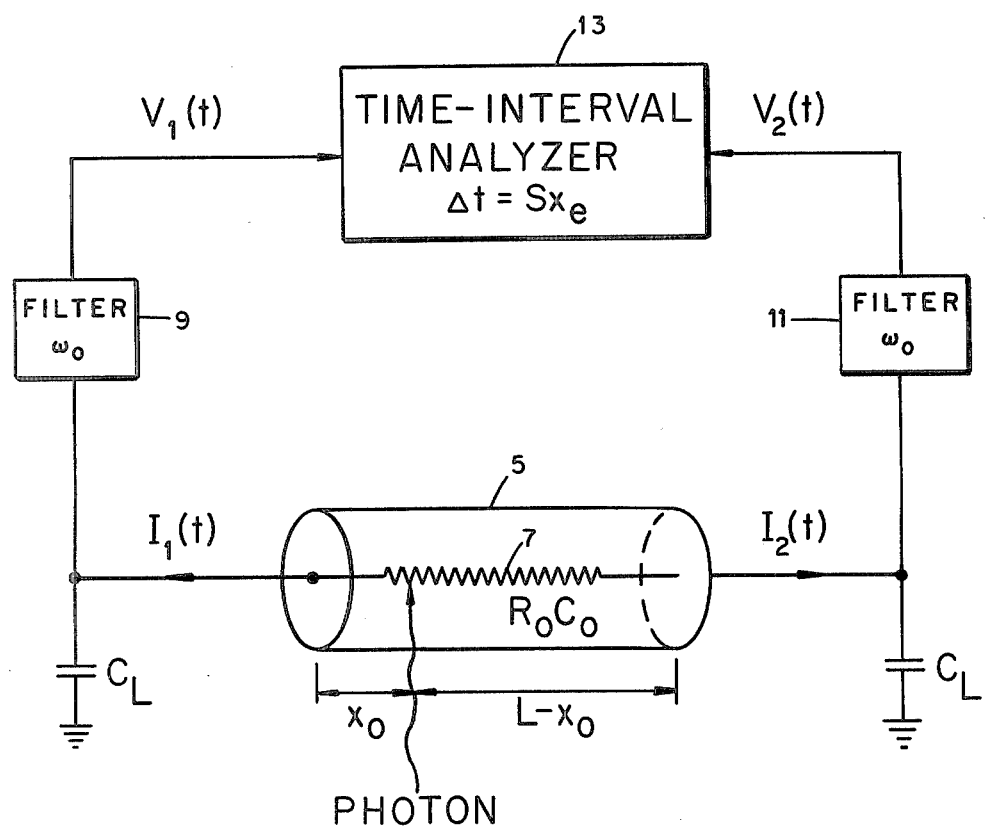
FIG. 1 is a simplified schematic diagram of a conventional prior art RC encoding detection system used with a high-resistane anode PSPC with conventional capacitive termination impedances.

Referring now to FIG. 1, there is shown a conventional PSPC system with a counter 5 having a resistive anode 7. The anode ends are terminated by physical or active capacitors $C_L$ and the current pulse $I_1$ and $I_2$ are sensed and shaped into bipolar pulses ($V_1$ and $V_2$) by conventional double differentiation techniques in filters 9 and 11, respectively. The zero voltage crossing times of the bipolar pulses are directly proportional to the shape of the individual current pulses sensed at the anode ends. The time interval ($\Delta t$) between zero-level crossings of these pulses is proportional to the distance ($X_o$) of the event generated by the entrance of a photon from the reference anode end. A time-interval analyzer 13, including zero-crossing detectors, is used to measure the time interval ($\Delta t$) between zero-level crossings of the pulses. Thus, $\Delta t = S x_e$, where $x_e$ is the measured coordinate of the photon impact position $X_o$; and S is the spatial sensitivity of the system. The selection of $\omega_o > 4 C_o / (R_o C_{GT}^2)$, where $C_{GT} = C_o L + 2 C_L$ and $\omega_o$ is the band-pass center frequency of the shaping filter, makes $S \simeq R_o C_{GT}$ practically independent of position; then, for most commercial filters, the thermal noise contribution (fwhm) of the RC line is $X_n = (2.35/Q)(4kTL/\omega_o R_o)^{\frac{1}{2}}$, where k is the Boltzmann constant, Q is the charge generated in response to the detection of an event, T is the absolute temperature of the RC line ($kT \simeq 4.1 \times 10^{-21} FV^2$ at $T = 300°$ K.).

Practical limitations in the time resolution of commercial cross-over timing circuits require that S must be >100 picoseconds/resolution length and $\omega_o$ must be as large as possible to keep the thermal noise contribution low and to reduce the signal processing time. On the other hand, if metal wire anodes are to be used, $R_o$ is limited to values of less than 30 ohms/mm.

Figure 2:
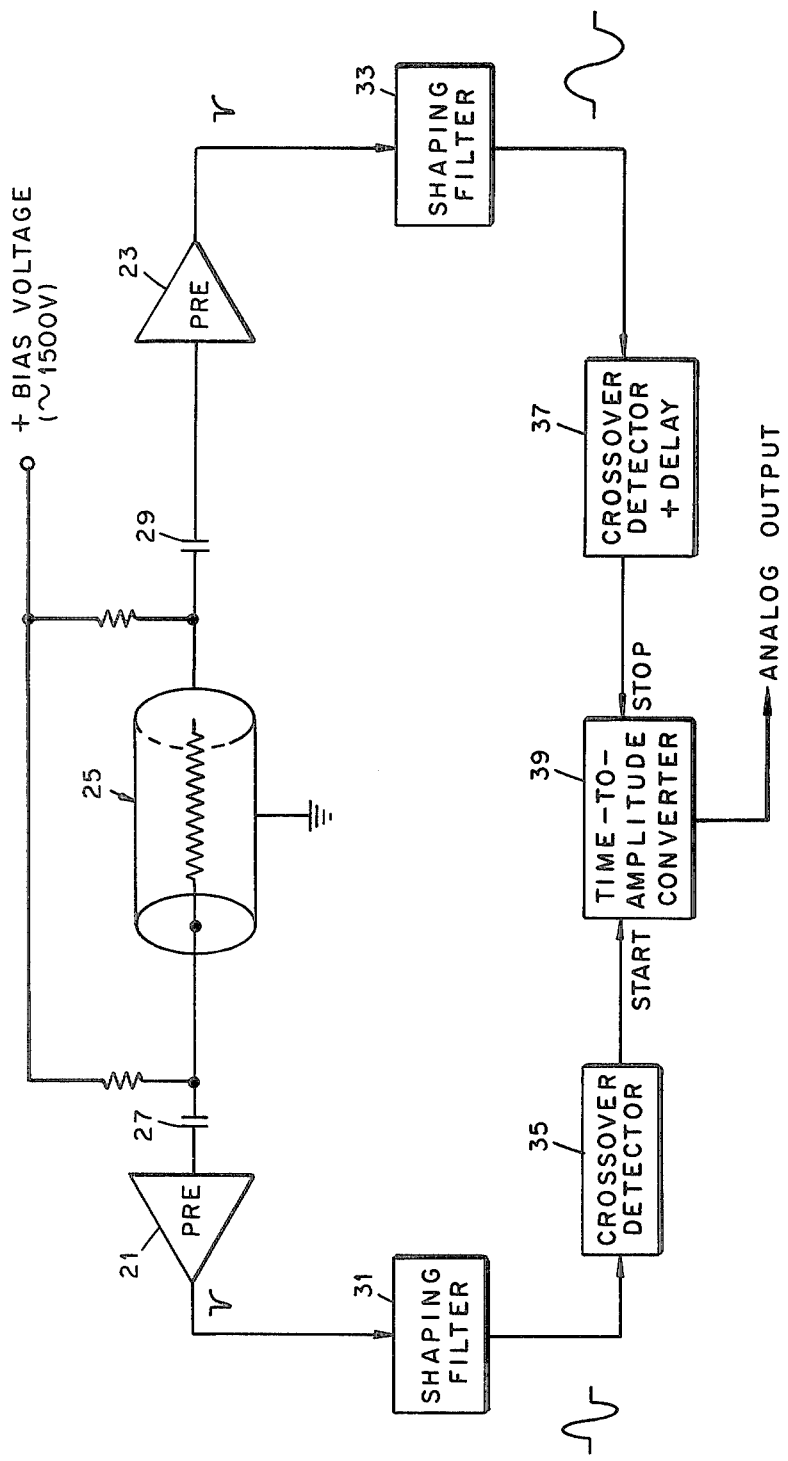
FIG. 2 is a schematic block diagram of a PSPC detection system according to the present invention.

These limitations and conditionals make it impractical to use single-wire, metal anode PSPC's length (L) greater than 40 cm. unless an active or physical capacitance load is used to increment $C_L$. An active-load capacitance is clearly preferred because serious degradation of the signal-to-noise ratio caused by preamplifier noise occurs when a physical capacitance of appreciable value (>10pF) is used. Since the accuracy of the position measurement depends on the stability of the active load, a system according to the present invention, as shown in FIG. 2, is provided which employs specially designed preamplifiers 21 and 23 coupled to the anode ends of a low-resistance anode counter 25 through coupling capacitors 27 and 29, respectively. Preamplifiers 21 and 23 act as stabilized active-capacitance loads to the anode ends.

The remainder of the circuit of FIG. 2 connected to the output of the preamplifiers 21 and 23 is essentially identical to the pulse rise time decoding circuit of FIG. 1, but shown in more detail. The preamplifiers 21 and 23 are connected to shaping filters 31 and 33, respectively, which produce the corresponding bipolar pulses with zero-level crossing times corresponding to the rise times of the pulses from the respective preamplifiers 21 and 23. The crossing times are detected by crossover detectors 35 and 37 which start and stop, respectively, a time-to-amplitude converter 39. The stop time signal from detector 37 is delayed by a time greater or equal to $LR_o C_{GT}/2$ by a built-in delay circuit, so that the time interval between the start and stop signals of the time-to-amplitude converter is greater or equal to zero for all positions between O and L. The time difference between the respective zero-level crossings of the bipolar pulses is in the form of an analog signal output from converter 39 which may be recorded in various conventional manners so that the amplitude of the signal is indicative of the position of a detected event along the counter anode.

Figure 3:
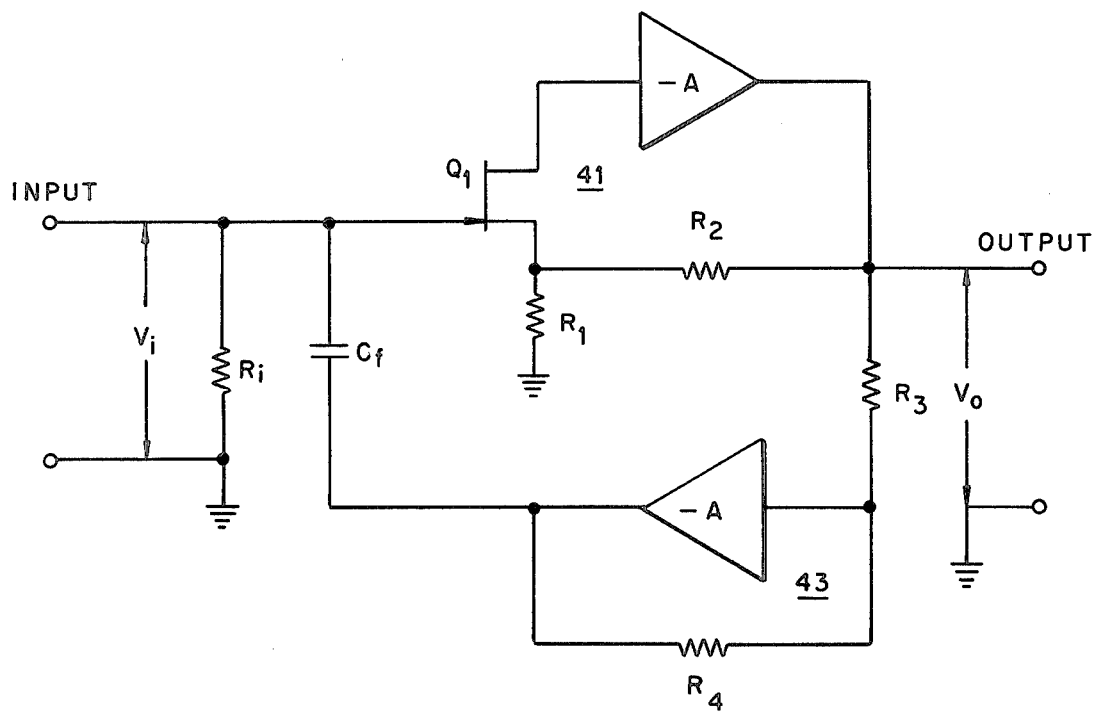
FIG. 3 is a schematic circuit diagram of one of the preamplifiers shown in block form in FIG. 2.

Referring now to FIG. 3, each preamplifier (21 and 23) is shown to be composed of a series-feedback, low-noise amplifier 41 and a unity-gain, shunt-feedback amplifier 43 connected to the gate electrode of the amplifier 41 FET ($Q_1$) input stage through a feedback capacitor $C_f$. There are three inversions of the signal through the feedback loop to obtain negative feedback at the gate electrode of $Q_1$. The output voltage $V_o$ is related to the input voltage $V_i$ according to the ratio of the resistances $(R_2 + R_1)/R_1$ which determines the overall gain (G). Additional details of the amplifier 41 may be obtained from the reference 4 listed above. The shunt-feedback amplifer 43 may be an operational amplifier connected as an inverting amplifier with the gain controlled by the ratio $R_4/R_3$ in a conventional manner. Normally $R_4$ and $R_3$ are equal to obtain unity gain. A detailed circuit diagram of the preamplifier is shown in FIG. 4 and a tabulation of the component values referenced to FIG. 4 is provided hereinbelow.

The active capacitance across the input terminals is $C_c \simeq C_f(G+1)$. Thus, $C_{GT} \simeq C_o L + 2[C_f(G+1) + C_s]$ where $C_s$ is the stray capacitance across the input terminals. The long-term variation of $C_c$, which depends on the stability of $C_f$ and G, is less than 0.1% for reasonable changes in ambient conditions, i.e. for temperatures between 10° and 30° C. $C_f$ is preferably a 1 pf ceramic capacitor with negligible temperature coefficient.

Figure 4:
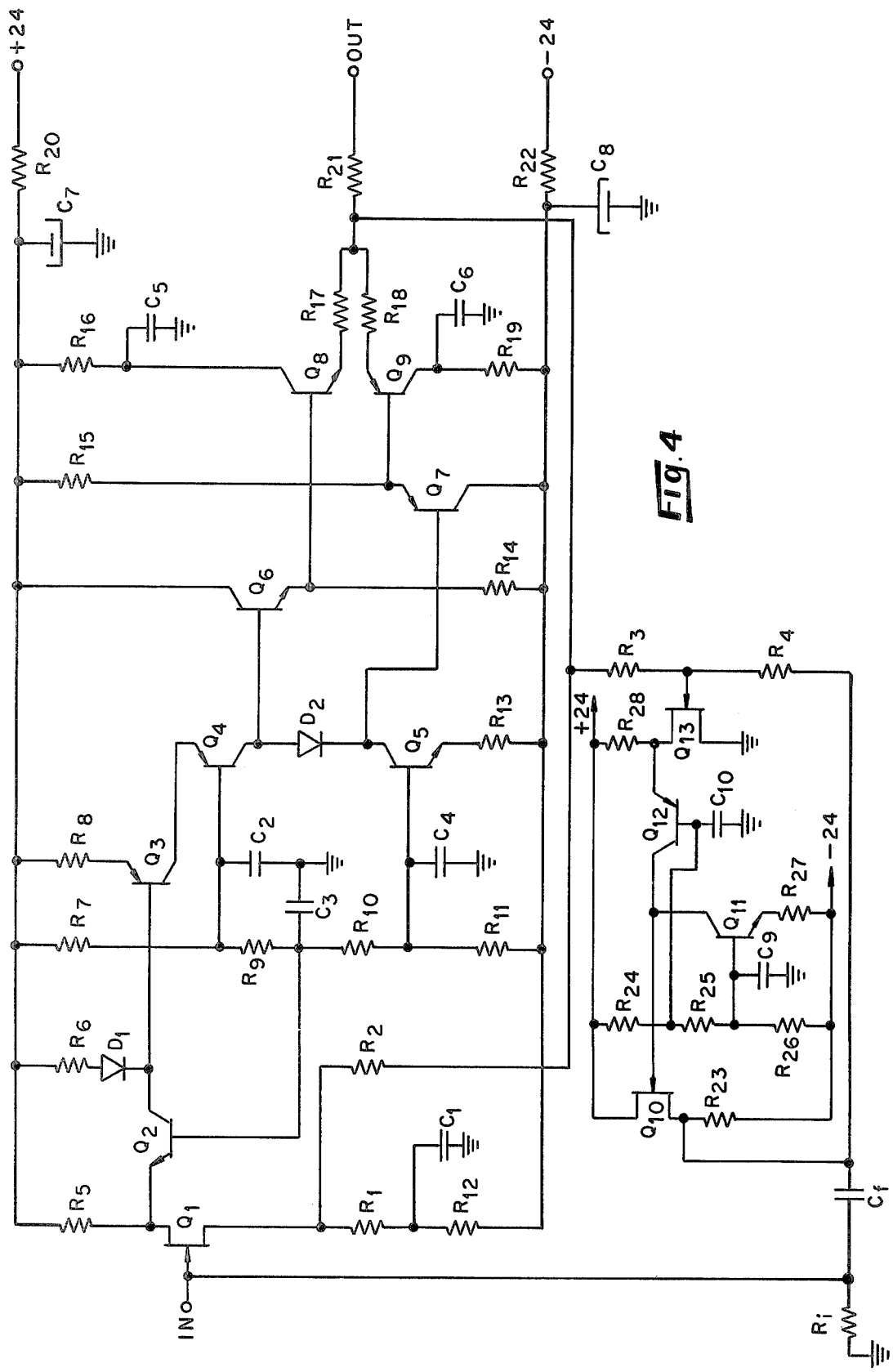
FIG. 4 is a detailed circuit diagram of the preamplifier of FIG. 3.

The stabilized, active input capacitance preamplifier of FIG. 4 was connected in the system as shown in FIG. 2 to a 12-cm-long experimental proportional counter. The anode was a 12-μm-diameter Nichrome wire of ~17.4 Ω/mm resistivity. $C_f$ was ~1 pF, G ~20, and $C_o$~$10^{-14}$ F/mm. Therefore, the resulting total active input capacitance $C_c$ was ~21 pF, the total PSPC capacitance ($C_{GT}$) was ~47 pF, and the spatial sensitivity S was ~820 psec/mm. The filter center frequency ($\omega_o$) was ~$4 \times 10^7$ radians/sec ($\tau_o$~25 nsec). The spatial uncertainty $x_n$ caused by thermal noise was ~0.2 mm (fwhm) for ~8 keV photons. (The anode bias was ~850 V, the gas multiplication was ~$10^4$, and the generated charge was ~$5 \times 10^{-13}$ coulomb/photon.)

Provided below is a list of the preamplifier component parts (types or values) referenced to FIG. 4, wherein like reference characters correspond to those shown also in FIG. 3.

| Component | Type or Value |
| --- | --- |
| Transistors | |
| $Q_1$, $Q_{10} + Q_{13}$ | FET 2N5245 |
| $Q_2$, $Q_5$, $Q_6$ and $Q_{11}$ | NPN 2N5089 |
| $Q_3$, $Q_4$, $Q_7$ and $Q_{12}$ | PNP 2N5087 |
| $Q_8$ | NPN 2N3643 |
| $Q_9$ | PNP 2N3645 |
| Diodes | |
| $D_1$ | FD 700 |
| $D_2$ (Four series connected) | IN 4446 |
| Resistors (ohms) | |
| $R_i$ | 100 Meg. |
| $R_1$ | 21.5 |
| $R_2$, $R_{16}$ and $R_{19}$ | 383 |
| $R_3$, $R_4$ and $R_6$ | 1 K |
| $R_5$ | 3.48 K |
| $R_7$ | 14.7 K |
| $R_8$, $R_{13}$ | 500 |
| $R_9$ | 4.6 K |
| $R_{10}$, $R_{25}$ | 2.6 K |
| $R_{11}$, $R_{26}$ and $F_{27}$ | 2.37 K |
| $R_{12}$ | 3.3 K |
| $R_{14}$ and $R_{15}$ | 11 K |
| $R_{17}$, $R_{18}$, $R_{20}$ and $R_{22}$ | 10 |
| $R_{21}$ | 93 |
| $R_{23}$ | 5.11 K |
| $R_{24}$ | 13.3 K |
| $R_{28}$ | 2.8 K |
| Capacitors | |
| $C_f$ | 1 pf |
| $C_1$, $C_5$ and $C_6$ | 2.2 μf |
| $C_2$, $C_3$, $C_4$, $C_9$ and $C_{10}$ | 0.1 μf |
| $C_7$ and $C_8$ | 33 μf |

What is claimed is:

1. A position-sensitive radiation detecting system comprising:
    an ionizing radiation detecting element having an anode from which electrical pulses are sensed at its ends in response to an ionizing event along the length of said anode;
    a pair of active-capacitance input preamplifiers connected respectively, to the ends of said anodes, each of said preamplifiers including,
        a series-feedback amplifier having an input and an output, said input of said series-feedback amplifier connected to the corresponding anode end of said detecting element,
        a shunt-feedback amplifier having an input and an output, said input of said shunt-feedback amplifier connected to the output of said series-feedback amplifier, and
        a capacitor connected between the output of said shunt-feedback amplifier and the input of said series-feedback amplifier; and
    pulse timing means responsive to the rise times of the pulses from the respective series-feedback amplifier outputs of said pair of preamplifiers for determining the position of said ionizing event along said anode.

2. The radiation detecting system as set forth in claim 1 wherein said ionizing radiation detecting element is a proportional counter having a metal wire anode.

3. The radiation detecting system as set forth in claim 2 wherein said anode is made of Nichrome wire.

4. The radiation detecting system as set forth in claim 1 wherein the detecting element is a proportional counter having a metal wire anode whose resistance is less than 30 ohms/mm.

* * * * *